United States Patent Office 3,227,611
Patented Jan. 4, 1966

3,227,611
METHOD OF COMBATTING PLANT HARMFUL ORGANISMS
Martinus Johannes Koopmans, Jacques Meltzer, Hendrikus Obias Huisman, Bernardus Gerhardus van den Bos, Kobus Wellinga, and Cornelis Johannes Schoof, all of Van Houtenlaan, Weesp, Netherlands, assignors to North American Philips Company, Inc., New York, N.Y., a corporation of Delaware
No Drawing. Original application Oct. 9, 1959, Ser. No. 845,324, now Patent No. 3,111,526, dated Nov. 19, 1963. Divided and this application Aug. 5, 1963, Ser. No. 303,710
8 Claims. (Cl. 167—33)

This is a division of application Serial No. 845,324, filed October 9, 1959, now U.S. Patent No. 3,111,526, granted November 19, 1963.

It is known that thionphosphoric acid esters with insecticidal activity of the formula:

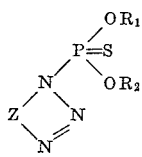

where Z designates the atom configuration to form a benzotriazole or a benzazimide and $R_1$ and $R_2$ are alkyl-groups, can be produced by reacting a cyclic nitrogen compound of the formula:

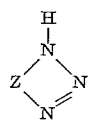

wherein Z has the aforesaid meaning, in the presence of a solvent and an acid binder, with a dialkylphosphorous acid monochloride, after which the required quantity of sulphur for the formation of thionphosphoric acid esters is caused to react with the compound obtained.

The invention relates to a method of producing novel derivatives of compounds with a cyclic-nitrogen-containing heterocyclic nucleus of aromatic character, of these derivatives, of producing preparations for combatting noxious organisms by means of these derivatives as active constituents, to these preparations and the combatting of noxious organisms by them.

From laboratory experiments it has been found that the compounds according to the invention may be suitable for combatting various kinds of noxious organisms.

The method according to the invention for producing novel derivatives of compounds having a cyclic-nitrogen-containing heterocyclic nucleus of aromatic character is characterized in that by methods known for the production of corresponding kinds of compounds or by analogous methods compounds of the general formula:

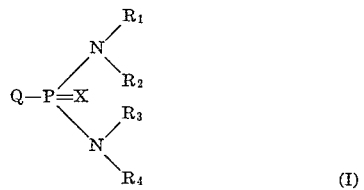

wherein Q designates the radical of a substituted or non-substituted, condensed or non-condensed compound having a cyclic-nitrogen-containing heterocyclic nucleus of aromatic character, which nucleus contains at least one group $>NH$, of which group, in the compounds of the Formula I, the hydrogen atom is replaced by the group:

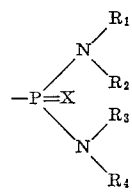

and in which formulae X is oxygen or sulphur and $R_1$, $R_2$, $R_3$ and $R_4$ are each hydrogen or an aliphatic hydrocarbon radical are produced.

It has been found that products with attractive biocidal activity are obtained particularly if Q or Formula I designates the radical of a substituted or non-substituted, condensed or non-condensed compound having a cyclic-nitrogen-containing heterocyclic nucleus of aromatic character with 5 cyclic atoms. Suitable derivatives of this kind or those of pyrrole, pyrazole, imidazole, triazole, tetrazole and the multinuclear, condensed ring systems derived therefrom, of which one or two benzene cycles form part, such as indole, dibenzpyrrole, benzpyrazole, benzimidazole and benztriazole.

As substituents at one or more carbon atoms of the heterocyclic nucleus of aromatic character may be used, for example: those having 1 to 18 carbon atoms such as substituted or non-substituted alkyl-, alkenyl-, cycloalkyl-, cycloalkenyl-, aryl-, aralkyl aralkenyl-, alkylamino-, dialkylamino-, arylamino, diarylamino, acylamino-, alkoxy- and alkylmercapto-groups and furthermore halogen atoms, preferably chlorine atoms, nitro-, amino-, ureido-, carboxy-, carbalkoxy- and sulphon-groups. Of the alkyl-groups are particularly useful those having 1 to 7 carbon atoms.

For $R_1$, $R_2$, $R_3$ and $R_4$ are preferably used alkyl-groups with 1 to 5 carbon atoms and, more particularly, methyl groups.

Especially the derivatives of 3-aminotriazole-1.2.4 constitute an interesting group of compounds according to the invention.

The compounds according to the invention may be produced in various ways. The introduction of the amidophosphoryl- or amidothiophosphoryl-group into the cyclic-nitrogen-containing heterocyclic compound may be carried out, for example, in a single process by the reaction of diamidophosphoryl or diamidothiophosphoryl-halide with the heterocyclic compound concerned. The production of the compounds according to the invention may be carried out, as an alternative, in a suitable manner in two reaction stages by reacting the heterocyclic compound concerned with phosphoroxy- or phosphorthiohalide or with an amidophosphoryl- or amidothiophosphoryldihalide, after which the product obtained is converted into the final product by the reaction of the former with ammonia, a mono- or dialkylamine. These reactions are efficacieously carried out in the presence of a hydrogen halide binder.

A suitable mode of carrying out the aforesaid reactions consist, furthermore in that the starting material is a cyclic-nitrogen-containing, heterocyclic compound in which the hydrogen atom of the group $>NH$ in the nucleus is replaced by a metal atom, preferably sodium or potassium.

Suitable methods are, in particular, the following:
(a) The reaction of the cyclic-nitrogen-containing heterocyclic compound, preferably in the presence of a hydrogen halide binder, with a compound of the formula:

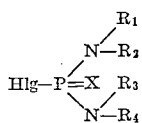

wherein X, $R_1$, $R_2$, $R_3$ and $R_4$ have the aforesaid meanings and Hlg is a halogen atom and preferably a chlorine atom.

(b) The reaction of the cyclic-nitrogen-containing heterocyclic compound, in which the hydrogen atom of the group >NH in the nucleus is replaced by a metal atom, preferably sodium or potassium, with a compound of the formula:

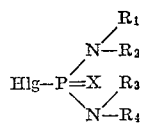

wherein X, $R_1$, $R_2$, $R_3$ and $R_4$ and Hlg have the aforesaid meanings.

(c) The reaction of the cyclic-nitrogen-containing heterocyclic compound, preferably in the presence of a hydrogen halide binder, with phosphoroxy- or phosphorthiohalide, preferably -chloride, followed by the conversion of the product obtained with ammonia, a mono- or dialkylamine, if desired in the presence of a hydrogen halide binder other than one of the last-mentioned amines or ammonia.

(d) The reaction of the cyclic-nitrogen-containing heterocyclic compound, in which the hydrogen atom of the group >NH in the nucleus is replaced by a metal atom, preferably sodium or potassium, with phosphoroxy- or phosphorthiohalide, followed by the conversion of the product obtained with ammonia, a mono- or dialkylamine, if desired in the presence of a hydrogen halide binder other than one of the last-mentioned amines or ammonia.

(e) The reaction of the cyclic-nitrogen-containing heterocyclic compound with an amidophosphoryl- or amidothiophosphoryl-dihalide, preferably in the presence of a hydrogen halide binder, followed by the conversion of the product obtained with ammonia, a mono- or dialkylamine, if desired in the presence of a hydrogen halide binder other than one of the last-mentioned amines or ammonia.

(f) The reaction of the cyclic-nitrogen-containing heterocyclic compound in which the hydrogen atom of the group >NH in the nucleus is replaced by a metal atom, preferably sodium or potassium, with an amidophosphoryl- or amidothiophosphoryldihalide, followed by the conversion of the product obtained with ammonia, a mono- or dialkylamine, if desired in the presence of a hydrogen halide binder other than one of the last-mentioned amines or ammonia.

Other methods which may be suitable for the production of compounds according to the invention are the following:

(g) The reaction of the phosphortrihalide, preferably -trichloride with the cyclic-nitrogen-containing heterocyclic compound, preferably in the presence of a hydrogen halide binder or with the cyclic-nitrogen-containing heterocyclic compound in which the hydrogen atom of the group >NH in the nucleus is replaced by a metal atom, preferably sodium or potassium, followed by the conversion of the product obtained with ammonia, a mono- or dialkylamine and oxidation, for example with hydrogen peroxide, of the formed amidophosphorous acid derivative, when X designates oxygen, and reaction of sulphur on the last-mentioned derivative, when X is sulphur.

(h) The reaction of an amidophosphorous acid dihalide, preferably dichloride with the cyclic-nitrogen-containing heterocyclic compound, preferably in the presence of a hydrogen halide binder or with the cyclic-nitrogen-containing heterocyclic compound in which the hydrogen atom of the group >NH in the nucleus is replaced by a metal atom, preferably sodium or potassium, followed by the conversion of the product obtained with ammonia, a mono- or dialkylamine and oxidation, for example, with hydrogen peroxide, of the formed amidophosphorous acid derivative, when X designates oxygen, and the reaction of sulphur on the last-mentioned derivative, when X is sulphur.

(i) The reaction of di(alkylamido)phosphorous acid halide, preferably -chloride with the cyclic-nitrogen-containing heterocyclic compound, preferably in the presence of a hydrogen halide binder, or with the cyclic-nitrogen-containing heterocyclic compound in which the hydrogen atom of the group >NH in the nucleus is replaced by a metal atom, preferably sodium or potassium, followed by oxidation, for example, with hydrogen peroxide of the product obtained when X is oxygen or by action of sulphur, when X designates sulphur.

(j) The reaction of the cyclic-nitrogen-containing heterocyclic compound with an alkylamidopyrophosphate.

Particularly the reactions mentioned under (a), (b), (c), (d), (e) and (f) may be important for the practical realization of the method according to the invention. Especially those mentioned under (e) and (f) are suitable for the production of compounds in which $R_1$ and $R_2$ are not identical to $R_3$ and $R_4$.

The aforesaid reactions are preferably carried out in the presence of a solvent for the cyclic-nitrogen-containing heterocyclic compound. In accordance with the nature of this compound and its substituents use will be made of an a polar or a more or less polar solvent. Suitable solvents of this kind are, for example, aliphatic and aromatic hydrocarbons, such as petroleum ether and benzene, aliphatic ethers, tertiary amines, for example, pyridine, nitrils such as acetonitril, ketones such as acetone and methylethylketone, esters such as ethylacetate, alcohols such as methanol and ethanol and, moreover, for example nitrobenzene, carbon tetrachloride and dimethylformamide.

For the metal compounds, for example, those of sodium and potassium are to be preferred polar solvents, such as acetonitril.

Hydrogen halide binders which are particularly suitable for the reactions mentioned under (a) and, especially those under (c) and (e), are amines and, particularly, tertiary amines such as trialkylamines, trimethyl- and triethylamines and N.N-dialkylanilines and, moreover, pyridine and especially homologues thereof, the picolines, lutidines and collidine and mixture thereof.

A further group of acid binders, which may be used with advantage with the reaction mentioned under (a) of the method according to the invention, are metal- and ammonium compounds such as the oxides, hydroxides, carbonates, bicarbonates, alcoholates and carboxylic acid salts. Suitable substances are, particularly, those of magnesium, calcium, barium and zinc and, especially, those of sodium and potassium. A very suitable method consists in that an alkaline metal alcoholate is utilized.

As is known the phosphorylhalides, thiophosphorylhalides, phosphorus halides and phosphoric acid halides are sensitive as acid halides to the effect of water and metal hydroxide solutions. For this reason, as a rule, the method according to the invention will be carried out in an anhydrous medium.

However, it was a surprise to find that with the reaction referred to under (a) the method according to the invention yields also very satisfactory results, if, as an acid binder, use is made of aqueous alkaline or alkaline-earth hydroxides or carbonates or bicarbonates of these metals. Particularly satisfactory yields of compounds according to the invention may be obtained, for example, by using 3-aminotriazole-1.2.4 or a derivative thereof dissolved in a mixture of a lower alcohol, for example, methanol or ethanol, and a 30 to 50% alkaline hydroxide of the quantity theoretically required for binding the hydrogen halide set free and the amidophosphoryl halide or thiophosphoryl halide being added to the solution thus obtained.

Quite contrary to expectations it has furthermore been found that in the reaction (a) satisfactory results can also be obtained by carrying out the method according to the invention with a dispersion of the cyclic-nitrogen-containing heterocyclic compound in a concentrated aqueous solution or suspension of an alkaline or alkaline-earth hydroxide. In a 50% by weight, aqueous sodium- or potassium hydroxide solution, starting from, for example, 3-aminotriazole-1.2.4 derivatives yields of 70 to 80% of the desired product could be obtained.

The reactions in which a tertiary amine is used as a hydrogen halide binder, are preferably carried out at a temperautre between 0 and 100° C., for example, between 40 and 80° C. When using metal- or ammonium-compounds as acid binders, the reaction may be carried out at a normal temperature, for example, between 15 and 30° C. The reaction temperature is preferably chosen to be somewhat lower, for example, between −10 and +10° C.; this applies particularly to the method in which the reaction is carried out in a hydrous medium, especially in a homogeneous medium.

It has been found that the employed hydrogen halide binder, either a metal- or a ammonium-compound or an amine, for example, a tertiary amine, does not affect the nature of the products obtained.

It should be noted that the cyclic-nitrogen-containing heterocyclic compounds, obtained by the method according to the invention and of which the nucleus or aromatic character contains not only the group >NH but also one or more nitrogen atoms, may occur in tautomeric forms. This means that the hydrogen atom bound to cyclic nitrogen has no fixed position. In accordance with conceptions expressed in this respect in literature, this means that the hydrogen atom goes over to a different nitrogen atom (see for example J. Org. Chem. XVIII, page 196, 1953). It could therefore be excepted that in the method according to the invention, in these cases, more isomeric products would be produced side by side. However, it has been found that in those cases in which tautomery can occur, mainly a single product is always obtained. In some cases isomeric compounds could be separated out in quantities of a few percent.

The starting materials for the method according to the invention have partly been described. In Organic Synthesis, vol. 26, page 11, the production of 3-amniotriazole-1.2.4 is described. J. Org. Chem. 18, pages 196–202 (1953), describes the production of a number of 3-amino-triazole-1.2.4 derivatives. The derivatives not described earlier and suitable for the method according to the invention of the cyclic nitrogen-containing heterocyclic compounds may be produced by methods similar to those described for the known derivatives.

The bis (N.N.-dialkylamido) phosphorylhalides and the corresponding thio-compounds may be produced, for example, by a method described in German patent specification No. 900,814.

The method of producing compounds according to the invention will now be described more fully with reference to some examples.

The denominations of the products obtained in accordance with the various examples are indicated in Table IV.

The values calculated in the various examples for the contents of the various elements of the products obtained invariably relate to a compound of 1 mol of the cyclic-nitrogen-containing heterocyclic compound and 1 mol of the derivative of the amidophosphoryl- or amido-thio-phosphorylhalide.

EXAMPLE I

To a mixture of 134 g. of 3-aminotriazole-1.2.4 (1.6 mol) 194 g. of collidine (1.6 mol) and 1.6 litres of acetonitril is added, at room temperature, 273 g. of bis (N.N.-dimethylamido)phosphorylchloride (1.6 mol). This mixture is then kept for six hours at the same temperature. During the addition and the further reaction the mixture is stirred. Then the acetonitril is distilled off in vacuo. The residue is extracted with benzene. The solution thus obtained is evaporated to a small volume. A product crystallizes out; it is recrystallized with the same solvent.

Yield 52%. Melting point 136.5–138° C.

*Analysis.*—Calculated: P, 14.19%. Found: P, 14.2%.

The examples indicated in Table I are carried out in a manner similar to that of Example I. Example I is also indicated in Table I. In this table are indicated the numerals of the examples, the starting substances, the hydrogen halide binders, the solvents, the reaction temperatures, the yields of products obtained, calculated on the quantities of cyclic-nitrogen-containing heterocyclic compounds serving as the starting substances, the physical constants of the products obtained.

In the Examples I to X and XV to XIX bis (N.N-dimethylamido) phosphorylchloride, in the Examples XI and XII bis (N.N.-diethylamido) phosphorylchloride and in Examples XIII and XIV bis (N.N.-dimethyl-amido) thiophosphorylchloride is used.

*Table I*

| No. | Starting substances | Acid binders | Solvent | Reaction temp., ° C. | Yield in percent | Melting point in ° C. |
|---|---|---|---|---|---|---|
| I | 3-aminotrizaole-1.2.4 | collidine | acetonitril | ca. 20 | 52 | 136.5–138 |
| II | 5-methyl-3-aminotriazole-1.2.4 | do | do | 60–70 | 53 | 91–92 |
| III | 5-ethyl-3-aminotriazole-1.2.4 | 2.6-dimethylpyridine | do | ca. 20 | 50 | 92–95 |
| IV | 5-(1'-methylethyl)-3-aminotriazole-1.2.4 | triethylamine | do | 60–65 | 50 | 105–106 |
| V | 5-n-pentyl-3-aminotriazole-1.2.4 | collidine | do | 60–70 | 47 | 52–53 |
| VI | 5-n-heptyl-3-aminotriazole-1.2.4 | mixture of α-, β-, γ-picoline | diethylether | 35 | 31 | (oil) |
| VII | 5-undecyl-3-aminotriazole-1.2.4 | 2.6-diethylpyridine | benzene | 70–80 | 45 | 46.5–47.5 |
| VIII | 5-phenyl-3-aminotriazole-1.2.4 | collidine | do | 70–80 | 71 | 167.5–168 |
| IX | 5-benzyl-3-aminotriazole-1.2.4 | do | acetonitril | 70 | 60 | 130.5–131 |
| X | 3-amino-5-styryltriazole-1.2.4 | do | do | 60–70 | 58 | 150–152 |
| XI | 3-aminotriazole-1.2.4 | do | do | 70–80 | 53 | 106–106.5 |
| XII | 5-n-pentyl-3-amino-triazole-1.2.4 | do | do | 70–75 | 87 | 139–140 |
| XIII | 3-aminotriazole-1.2.4 | 3-amino-triazole-1.2.4 | do | 65–70 | 22 | 120–121 |
| XIV | 5-n-pentyl-3-amino-triazole-1.2.4 | pyridine | pyridine | 25 | 65 | 139–140 |
| XV | 5-(4'-chlorophenyl)-3-aminotriazole-1.2.4 | collidine | acetonitril | 70–75 | 73 | 170–171 |
| XVI | 5-(4'-methoxyphenyl)-3-aminotriazole-1.2.4 | do | do | 75–80 | 72 | 173–174 |
| XVII | 5-carbaethoxy-3-aminotriazole-1.2.4 | do | do | 50–60 | 51 | 151–153 |
| XVIII | 5-carb-n-pentoxy-3-aminotriazole-1.2.4 | do | do | ca. 70 | 45 | 105–107 |
| XIX | 5-carb-isopropoxy-3-aminotriazole-1.2.4 | do | do | 70–80 | 59 | 181–182 |
| XX | 4.5-diphenylimidzole | 4-5.diphenylimidazole | acetone | 56 | 25 | 157 |
| XXI | 5-(4'-methoxyphenyl)-3-aminotriazole-1.2.4 | collidine | acetonitril | 75–80 | 72 | 173–174 |
| XXII | 5-aminotetrazole | do | benzene | 60 | 45 | [1] ca. 185 |

[1] Decomposition.

EXAMPLE XXIII

In a solution of sodium methanolate in methanol, obtained by dissolving 2.3 g. of sodium in 65 ml. of methanol, is dissolved 15.4 g. of 5-pentyl-3-aminotriazole-1.2.4. Then 20 g. of bis(N.N.-dimethylamido) phosphorylchloride is added in drops and afterwards the mixture is stirred for 2.5 hours at 80° C. After cooling the sodium chloride formed is filtered off, the filtrate is evaporated and the residue obtained is dissolved in ether. The ethereal solution is washed three times with a small quantity of water, dried on sodium sulphate and thickened. The residue was recrystallized with a mixture of petroleumether (boiling range 40 to 60° C.) and ether (3:1).

Yield 15.9 g. (55%). Melting point 51–53° C.

EXAMPLE XXIV

In a similar manner 5-phenyl-3-aminotriazole-1.2.4 was caused to react with bis(N.N.-dimethylamido) phosphorylchloride also in methanol, the hydrogen halide binder being sodium methanolate. In this case the final product was crystallized with a mixture of ethanol and water (1:3).

Yield 80%. Melting point 167–168° C.

EXAMPLE XXV

In 55 ml. of anhydrous ethanol was dissolved 2 g. of NaOH (1/20 mol) and 8 g. of 5-phenyl-3-aminotriazole-1.2.4 (1/20 mol). To the solution was added 10 g. of bis(N.N.-dimethylamido)phosphorylchloride at a temperature of 0 to 5° C. The reaction mixture was then stirred for four hours at 0 to 5° C. The NaCl formed was filtered off. The filtrate was thickened and the residue was crystallized with a mixture of alcohol and water (1:3).

Yield 10.8 g. (73%). Melting point 167–168° C.

EXAMPLE XXVI 4 g. of 5-phenyl-3-aminotriazole-1.2.4 (1/40 mol) was dissolved in a solution of 1 g. of sodium hydroxide (1/40 mol) in 20 ml. of methanol; to the solution was added in drops, whilst stirring, 5 g. of bis(N.N.-dimethylamido) phosphorylchloride at a temperature of about −10° C. Then stirring was continued for one hour at a temperature between 10 and +10° C. The reaction mixture was filtered and the methanol was removed by evaporation in vacuo. The crystalline product was suspended in 50 ml. of 0.5 N caustic soda and then filtered off.

Melting point 167–168° C.

EXAMPLE XXVII 4 g. of 5-phenyl-3-aminotriazole-1.2.4 (1/40 mol) was introduced into a suspension of 7.96 g. of Ba(OH)$_2$.H$_2$O in 50 ml. of ethanol. To the mixture was added in drops 5 g. of bis(N.N.-dimethylamido) phosphorylchloride at a temperature of about −10° C. The mixture was then stirred for three hours.

The deposit formed was filtered off and the solution was thickened in vacuo. The crystalline residue was suspended in 50 ml. of 0.5 N caustic soda and then filtered off.

Yield 70%. Melting point 166–167° C.

EXAMPLE XXVIII

Into 25 ml. of ethanol was introduced 1 g. of NaOH (1/40 mol) (as a 50% solution in water) and 4 g. of 5-phenyl-3-aminotriazole-1.2.4 (1/40 mol). Then, at a temperature of 0 to 5° C., 5 g. of bis(N.N.-dimethylamido) phosphorylchloride was added dropwise; the solution was then stirred at the same temperature for three hours. The NaCl was filtered off, the filtrate thickened and the residue was crystallized with a mixture of ethanol and water (1:3).

Yield 5.2 g.; 71%. Melting point 167–168° C.

EXAMPLE XXIX

Into 35 g. of anhydrous ethanol was introduced 1.0 g. of NaOH (1/40 mol) (as a 50% solution in water) and 3.85 g. of 5-pentyl-3-aminotriazole-1.2.4 (1/40 mol).

At a temperature of 0 to 5° C. was added dropwise 5 g. of bis(N.N.-dimethylamido) phosphorylchloride. Then for two and a half hours the mixture was stirred at the same temperature.

The NaCl formed was filtered off and the filtrate was thickened. The residue was dissolved in ether and the solution in ether was washed three times with a small quantity of water (to neutral reaction).

The ethereal extract was dried and thickened.

Yield 6.76 g., 94%. Melting point 42–49° C.

After two recrystallisations, once with petroleumether (40–60° C.) and once with a mixture of petroleumether (boiling range 40–60° C.) and ether (2:1), melting point of 51–52° C. was reached.

EXAMPLE XXX

In 50 ml. of a 50% by weight solution of KOH in water was suspended 4 g. of 5-phenyl-3-aminotriazole-1.2.4 (1/40 mol). To the suspension was added in drops at −50 to 10° C., 5 g. of bis(N.N.-dimethylamido) phosphorylchloride, after which the mixture was stirred at the same temperature for 2.5 hours. The reaction mixture was diluted with 100 ml. of water and the product obtained was filtered off.

Yield 5.63 g., 77%. Melting point 166–167° C.

EXAMPLE XXXI

In 50 ml. of water was dissolved 2 g. of NaOH (1/20 mol) and 8 g. of 5-phenyl-3-aminotriazole-1.2.4 (1/20 mol). To the solution thus obtained was added 10 g. of bis (N.N.-dimethylamido) phosphorylchloride at a temperature of 0 to 5° C., after which stirring was continued for 2.5 hours. The deposit was filtered off and extracted with chloroform.

The residue was 5-phenyl-3-aminotriazole-1.2.4.

Yield: 5.85 g., 73%. Melting point 184–187° C.

The chloroform solution was thickened and the residue was crystallized with a mixture of ethanol and water (1:3).

Yield: 0.78 g., 5.3%. Melting point 165–167° C.

EXAMPLE XXXII 8 g. of 5-phenyl-3-aminotriazole-1.2.4 (0.05 mol) and 50 ml. of 30% by weight of sodium hydroxide were combined. The mixture, whilst stirring, had added to it 10 g. of bis(N.N.-dimethylamido)phosphorylchloride in drops at a temperature of −5 to −10° C. The whole mixture was then stirred again for one and a half hours at a temperature of about 0° C. then 100 ml. of water was added. The deposited, crystalline product was filtered off.

Yield 22%. Melting point 166–167° C.

EXAMPLE XXXIII

To a solution of 0.1 g mol of benzimidazole in 50 ml. of ethanol was added to 10 ml. of caustic soda (10% by weight). The solution obtained was evaporated to dryness in vacuo. To the residue was added 25 ml. of dry benzene and the mixture was again evaporated to dryness to remove the last residues of water and alcohol. The residue was pulverized and suspended in 100 ml. of dry benzene. To this solution was added 0.1 g. mol. of bis(N.N. - dimethylamido)phosphorylchloride. After having been kept at room temperature for 12 hours, the sodium chloride separated out was filtered off, the filtrate was thickened in vacuo and the residue was distilled.

Yield 50%. Boiling point 178–179° C. at 1 mm. Hg.

(The distillate was an oil, which finally solidified at room temperature.)

*Analysis.*—Calculated: P, 12.3%; N, 22.2%. Found P, 11.8%; N, 21.8%.

EXAMPLE XXXIV

Similarly to the method described in Example XXXIII was produced bis(N.N.-dimethylamido)phosphoryl-2-methylbenzimidazole from 2-methylbenzimidazole and bis(N.N.-dimethylamido)phosphorylchloride.

Yield 30%. Boiling point 175–176.5° C. at 1 mm. Hg.
Analysis.—Calculated P, 11.6%; N, 21.1%. Found P, 10.5%; N, 20.5%.

EXAMPLE XXXV

To a solution of 6.5 g. of 5-nitrobenzimidazole in 25 ml. of ethanol was added a solution of 1.6 g. of sodium hydroxide in 5 ml. of water. After evaporation to dryness in vacuo were added in order of succession 50 ml. of acetone and 6.8 g. of bis(N.N.-dimethylamido)phosphorylchloride. After the mixture had been boiled for 10 minutes at a reflux cooler, the sodium chloride produced was filtered off and the filtrate was thickened in vacuo. The residue was kept at a temperature between 0 and 5° C. After a few days it had crystallized. It was dissolved in 25 ml. of benzene and precipitated by adding petroleumether (boiling range 80–100° C.). The brownish powder was filtered off and dried.

Yield 17%. Melting point 85–92° C.

EXAMPLE XXXVI

In a solution of sodium methanolate in methanol, obtained by dissolving 0.46 g. of sodium in 15 ml. of methanol, was dissolved 13.4 g. of 3.5-dimethyl-4-phenylpyrazole. The methanol was evaporated and the residue obtained was mixed with 20 ml. of acetonitril. To the mixture was added in drops 4 g. of bis(N.N.-dimethylamido)phosphorylchloride. The mixture obtained was then heated at about 80° C. for one hour. After cooling the deposit obtained by the reaction was filtered off, the filtrate thickened in vacuo and the residue obtained dissolved in ether. The etheral solution was shaken successively with an aqueous solution of sodium bicarbonate and water and then dried and thickened. The residue was distilled in high vacuo. The distillate obtained solidified.

Yield 67%. Boiling point 155–157° C. at 0.15 mm. Hg. Melting point 51–60° C.

Analysis.—Calculated P, 10.11%. Found, P, 9.5%.

Table II indicates data of the Examples XXXVII to XLIV, the method of which is completely similar to that of Example XXXVI. This table indicates successively: the numeral, the cyclic-nitrogen-containing heterocyclic compound used as the starting substance, the solvent employed, the reaction temperature in degrees centigrade, the yield of product obtained, calculated on the quantity of starting cyclic-nitrogen-containing heterocyclic compound, physical constants. For the physical constants are indicated a boiling point or a melting point or both. The boiling point is indicated by F, followed by the temperature in degrees centigrade and the associated pressure in mm. Hg. The melting point, expressed in degrees centigrade, is designated by S.

In all examples the bis(N.N.-dimethylamido)phosphorylchloride is used as the amidophosphorylhalide.

Table II

| No. | Starting substances | Solvent | Reaction temp., ° C. | Yield in percent | Physical constants |
|---|---|---|---|---|---|
| XXXVII | triazole-1.2.4 | acetonitril | ca. 70 | 61 | F=109–112° C. at 0.45 mm. Hg. |
| XXXVIII | 3.5-dimethyl-triazole-1.2.4 | do | ca. 80 | 74 | F=113–116° C. at 0.6 mm. Hg; S=44–46° C. |
| XXXIX | 3-chlorotriazole-1.2.4 | do | ca. 80 | 54 | S=53–55° C. |
| XL | 3-chloro-5-pentyltriazole-1.2.4 | do | ca. 80 | 100 | (oil). |
| XLI | benztriazole | do | ca. 80 | 78 | S=80–81° C. |
| XLII | 3.5-dimethylpryazole | do | ca. 80 | 60 | F=84–86° C. at 0.2 mm. Hg. |
| XLIII | indazole | do | ca. 80 | 87 | (oil). |
| XLIV | 3-chloroindazole | do | ca. 80 | 63 | S=56–64° C. |

EXAMPLE XLV

The sodium compound of 8.7 g. of 3-chlortriazole-1.2.4 was mixed with 80 ml. of acetonitril as a diluent. Thereto was added 14 g. of bis(N.N.-dimethylamide) thiophosphorylchloride and the mixture was stirred at about 80° C. for 4 hours. After cooling the sodiumchloride formed was filtered off, the filtrate thickened and the residue thereof dissolved in ether. The ethereal solution was washed with water, dried and thickened. The residue was distilled in vacuo, the distillate solidified.

Yield 13 g., 68%. Boiling point 103–106° C. at 0.005 mm. Hg. Melting point 40–43° C.

Analysis.—Calculated P, 12.21%. Found P, 12.5%.

In Table III are indicated data about the Examples XLVI to LIX, with which the method is similar to that of Example XLV. This table indicates successively the numeral, the cyclic-nitrogen-containing heterocyclic compound used as a starting substance, the diluent employed, the reaction temperature in degrees centigrade, the yield of final product calculated on the starting cyclic-nitrogen-containing heterocyclic compound, physical constants. Of the physical constants a boiling point or a melting point or both are stated. The boiling point is designated by F, followed by the temperature in degrees centigrade and the associated pressure in mm. Hg. The melting point, expressed in degrees centigrade, is indicated by S.

In the examples the bis (N.N.-dimethylamido) phosphorylchloride is always used as the amidophosphorylhalide, with the exception of Example XLVI; herein use is made of bis(N.N-dimethylamido) thiophosphorylchloride. The metal compound is always the sodium compound of the cyclic-nitrogen-containing heterocyclic compound, with the exception of Example LI, herein the potassium compound is used.

The metal compounds of the cyclic-nitrogen-containing heterocyclic compounds may be produced in various ways. These of the compounds of Table III are produced partly by dissolving metallic sodium in the cyclic-nitrogen-containing heterocyclic compound, partly by dissolving these compounds in a solution of sodium methanolate in methanol, the methanol being subsequently completely removed by distillation.

In Example LI the metal compound was obtained by melting carbazole together with potassium hydroxide.

Yield: 22.8 g., 70%. Melting point 112–113° C. Melting point of the anhydrous product 130–134° C.

Table III

| No. | Starting substances | Solvent | Reaction temp., ° C. | Yield in percent | Physical constants |
|---|---|---|---|---|---|
| XLVI | 3-chloro-5-pentyltriazole-1.2.4 | acetonitril | ca. 80 | 69 | F=132–135° C. at 0.01 mm. |
| XLVII | Indole | do | ca. 20 | 66 | S=121–123° C. |
| XLVIII | 2-ethylbenzimidazole | do | 70–80 | 82 | F=137–140° C. at 0.05 mm. |
| XLIX | 2-pentylbenzimidazole | do | 70–80 | 80 | F=149–151° C. at 0.05 mm. |
| L | 2-phenylbenzimidazole | do | 70–80 | 73 | S=128–129. |
| LI | carbazole | do | ca. 20 | 80 | S=103–104° C. |
| LII | 3-chloro-5-phenyltriazole-1.2.4 | do | ca. 80 | 88 | (oil). |
| LIII | 5-isobutyl-3-aminotriazole-1.2.4 | do | ca. 80 | 69 | S=91–92.5° C. |
| LIV | 5-n-propyl-3-aminotriazole-1.2.4 | do | 60–70 | 68 | 61.5–63° C. |
| LV | 5-n-butyl-3-aminotriazole-1.2.4 | do | ca. 80 | 56 | 54–56° C. |
| LVI | 6-methyl-benztriazole | do | ca. 80 | 83 | (oil). |
| LVII | 3-ureido-5-phenyltriazole-1.2.4 | ethanol | 5–10 | 73 | 194° C. |
| LVIII | 3-acetylamino-5-fenyltriazole-1.2.4 | acetonitril | ca. 80 | 40 | 107–109° C. |
| LIX | 3.5-dimethyl-4-aminopyrazole | do | ca. 20 | 47 | (oil). |

In the following Examples LX to LXV the production of the compounds according to the invention took place in two reaction stages: the heterocyclic compound concerned or the sodium compound thereof was first caused to react with phosphoroxychloride, after which the product obtained was converted with mono- or dimethylamine.

EXAMPLE LX

To a solution of 16.75 g. of freshly distilled phosphoroxychloride in 150 ml. of dry diethylether was added, within half an hour, a suspension of 15.4 g. of very finely powdered 5-n-pentyl-3-amino-triazole-1.2.4 in a solution of 12.1 g. of collidine in 30 ml. of dry diethylether. During the addition the temperature was kept between —15 and —20° C., whilst the reaction mixture was stirred thoroughly. The hydrochloric acid salt of collidine was precipitated; 30 minutes after the addition had been completed, dry, gaseous dimethylamine was introduced into the reaction mixture at a temperature between —15 and —20° C. The deposit of the hydrochloric acid salt of collidine was slowly replaced by that of dimethylamine. The introduction of dimethylamine was continued until the reaction liquid exhibited distinctly a permanent alkaline reaction. After filtering of the deposit, the filtrate was distilled. Thus first the diethylether and then the collidine distilled out. For a complete removal of the latter substance, the mixture was finally distilled in vacuo. After the addition of 50 ml. of 1 N caustic soda to the distillate, the mixture thus obtained was extracted a few times with diethylether. The collected extracts were washed three times with 5 ml. of water, then once with 5 ml. of 1 N hydrochloric acid and finally with water to neutral reaction. The ethereal solution was dried on sodium sulphate. Then the diethylether was distilled off; the residual oil crystallized soon.

Yield: 21.5 g., 75%. Melting point 44–48° C.

EXAMPLE LXI

A suspension of 17.4 g. of 5-benzyl-3-aminotriazole-1.2.4 in a solution of 12.1 g. of collidine in 20 ml. of dry acetonitril was added in one hour to a solution of 16.75 g. of freshly distilled phosphoroxychloride in 150 ml. of dry benzene. During the addition the mixture was stirred thoroughly, whilst the temperature of the reaction mixture was kept between 5 and 15° C. After the mixture obtained had been stirred at about 15° C. for one hour, dry gaseous dimethylamine was introduced at the said temperature, until the reaction mixture exhibited distinctly an alkaline reaction. The initial deposit of the hydrochloric acid salt of collidine was thus dissolved, whilst that of dimethylamine was precipitated. The last-mentioned salt was filtered off and the filtrate was thickened. The residue thereof became soon crystalline. It was recrystallized with a mixture of water and alcohol. The product obtained proved to contain 1 mol of crystal water.

EXAMPLE LXII

Of 5-phenyl-aminotriazole-1.2.4 the sodium salt was produced by dissolving, in a solution of 16.0 g. of the triazole in 40 ml. of absolute methanol, 2.3 g. of sodium, the solution thus obtained being evaporated to dryness.

The sodium salt obtained was pulverized and added, within one hour, to a solution of 16.75 g. of freshly distilled phosphoroxychloride in 150 ml. of dry benzene. During the addition the mixture was stirred vigorously, whilst the temperature of the mixture was kept between 0 and 5° C. Hydrochloric acid was precipitated. After the mixture had been stirred at the said temperature for another hour, dry gaseous dimethylamine was introduced at a temperature between 5 and 10° C. until the mixture exhibited a permanent alkaline reaction. After filtering of the hydrochloric acid salt of dimethylamine the filtrate was thickened. The semi-solid residue obtained was treated with 50 ml. of 2 N caustic soda and a small supply of alcohol. The crystalline white substance obtained was filtered, washed with water and dried.

Yield: 22 g. (75%). Melting point 164–165° C.

EXAMPLE LXIII

In the manner described in Example LXII 3-amino-5-benzyltriazole-1.2.4 was caused to react with phosphoroxy-chloride in benzene as a solvent. Then, between 0 and —5° C. monomethylamine gas was introduced into the reaction mixture and the product obtained was processed as described above.

Yield 36%. Melting point 177–180° C. (decomposition).

*Analysis.*—Calculated P, 11.05%. Found: P, 11.0%.

EXAMPLE LXIV

In the manner described in Example LXI first phosphoroxychloride was caused to react with 5-phenyl-3-aminotriazole-1.2.4 and with the reaction mixture obtained monomethylamine.

Yield of the product: 23%. Melting point 182–183° C.

EXAMPLE LXV 17.8 g. of dimethylamide-phosphoryldichloride was added in total to a suspension of 16.0 g. of 3-amino-5-phenyltriazole-1.2.4 in 150 ml. of dry benzene, in which 13.5 g. collidine had been dissolved. Then the mixture was stirred at 40 to 50° C. for five hours. The fine suspension of the 3-amino-5-phenyltriazole-1.2.4 was slowly replaced by a deposit of collidine hydrochloric acid salt.

The reaction mixture was cooled to 5° C. and dry dimethylamine gas was introduced until the reaction remained alkaline. The temperature was kept between 5 and 15° C. during the introduction of the gas.

The precipitate was filtered and washed with dry benzene. The benzene solution was thickened in vacuo and the residue crystallized out.

The solid substance was suspended in petroleumether (boiling region 40 to 60° C.), then filtered and washed successively with water, 1 N caustic soda and water and then dried.

Yield: 25.3 g. (86%). Melting point 159–162° C.

Table IV indicates, after the numeral of the example concerned, the denomination of the compound obtained.

*Table IV*

| Example | Product |
|---|---|
| I | N-bis(N.N-dimethylamido)phosphoryl-3-aminotriazole-1.2.4. |
| II | N-bis(N.N-dimethylamido)phosphoryl-5-methyl-3-aminotriazole-1.2.4. |
| III | N-bis(N.N-dimethylamido)phosphoryl-5-ethyl-3-aminotriazole-1.2.4. |
| IV | N-bis(N.N-dimethylamido)phosphoryl-5-(1'-methylethyl)-3-aminotriazole-1.2.4. |
| V | N-bis(N.N-dimethylamido)phosphoryl-5-n-pentyl-3-aminotriazole-1.2.4. |
| VI | N-bis(N.N-dimethylamido)phosphoryl-5-n-heptyl-3-aminotriazole-1.2.4. |
| VII | N-bis(N.N-dimethylamido)phosphoryl-5-undecyl-3-aminotriazole-1.2.4. |
| VIII | N-bis(N.N-dimethylamido)phosphoryl-5-phenyl-3-aminotriazole-1.2.4. |
| IX | N-bis(N.N-dimethylamido)phosphoryl-5-benzyl-3-aminotriazole-1.2.4. |
| X | N-bis(N.N-dimethylamido)phosphoryl-3-amino-5-styryltriazole-1.2.4. |
| XI | N-bis(N.N-diethylamido)phosphoryl-3-aminotriazole-1.2.4. |
| XII | N-bis(N.N-diethylamido)phosphoryl-5-n-pentyl-3-aminotriazole-1.2.4. |
| XIII | N-bis(N.N-dimethylamido)thiophosphoryl-3-aminotriazole-1.2.4. |
| XIV | N-bis(N.N-dimethylamido)thiophosphoryl-5-n-pentyl-3-aminotriazole-1.2.4. |
| XV | N-bis(N.N-dimethylamido)phosphoryl-5-(4'-chlorophenyl)-3-aminotriazole-1.2.4. |
| XVI | N-bis(N.N-dimethylamido)phosphoryl-5-(4'-methoxyphenyl)-3-aminotriazole-1.2.4. |
| XVII | N-bis(N.N-dimethylamido)phosphoryl-5-carboethoxyethoxy-3-aminotriazole-1.2.4. |
| XVIII | N-bis(N.N-dimethylamido)phosphoryl-5-carb-n-pentoxy-3-aminotriazole-1.2.4. |
| XIX | N-bis(N.N-dimethylamido)phosphoryl-5-carb-isopropoxy-3-aminotriazole-1.2.4. |
| XX | N-bis(N.N-dimethylamido)phosphoryl 4.5-diphenylimidazole. |
| XXI | N-bis(N.N-dimethylamido)phosphoryl-5-(4'-methoxyphenyl)-3-aminotriazole-1.2.4. |
| XXII | N-bis(N.N-dimethylamido)phosphoryl-5-aminotetrazole. |
| XXIII | N-bis(N.N-dimethylamido)phosphoryl-5-pentyl-3-aminotriazole-1.2.4. |
| XXIV | N-bis(N.N-dimethylamido)phosphoryl-5-phenyl-3-aminotriazole-1.2.4. |
| XXV | Do. |
| XXVI | Do. |
| XXVII | Do. |
| XXVIII | Do. |
| XXIX | N-bis(N.N-dimethylamido)phosphoryl-5-pentyl-3-aminotriazole-1.2.4. |
| XXX | N-bis(N.N-dimethylamido)phosphoryl-5-phenyl-3-aminotriazole-1.2.4. |
| XXXI | Do. |
| XXXII | Do. |
| XXXIII | N-bis(N.N-dimethylamido)phosphoryl-benzimidazole. |
| XXXIV | N-bis(N.N-dimethylamido)phosphoryl-2-methylbenzimidazole. |
| XXXV | N-bis(N.N-dimethylamido)phosphoryl-5-nitrobenzimidazole. |
| XXXVI | N-bis(N.N-dimethylamido)phosphoryl-3.5-dimethyl-4-phenylpyrazole. |
| XXXVII | N-bis(N.N-dimethylamido)phosphoryl-triazole-1.2.4. |
| XXXVIII | N-bis(N.N-dimethylamido)phosphoryl-3.5-dimethyltriazole-1.2.4. |
| XXXIX | N-bis(N.N-dimethylamido)phosphoryl-3-chlorotriazole-1.2.4. |
| XL | N-bis(N.N-dimethylamido)phosphoryl-3-chloro-5-pentyltriazole-1.2.4. |
| XLI | N-bis(N.N-dimethylamido)phosphoryl-benztriazole. |
| XLII | N-bis(N.N-dimethylamido)phosphoryl-3.5-dimethylpyrazole. |
| XLIII | N-bis(N.N-dimethylamido)phosphoryl-indazole. |
| XLIV | N-bis(N.N-dimethylamido)phosphoryl-3-chloroindazole. |
| XLV | N-bis(N.N-dimethylamido)thiophosphoryl-3-chlorotriazole-1.2.4. |
| XLVI | N-bis(N.N-dimethylamido)thiophosphoryl-3-chloro-5-pentyl-triazole-1.2. |
| XLVII | N-bis(N.N-dimethylamido)phosphoryl-indole. |
| XVIII | N-bis(N.N-dimethylamido)phosphoryl-2-ethylbenzimidazole. |
| XLIX | N-bis(N.N-dimethylamido)phosphoryl-2-pentylbenzimidazole. |
| L | N-bis(N.N-dimethylamido)phosphoryl-2-phenylbenzimidazole. |
| LI | N-bis(N.N-dimethylamido)phosphoryl-cabazole. |
| LII | N-bis(N.N-dimethylamido)phosphoryl-3-chloro-5-phenyl-triazole-1.2.4. |
| LIII | N-bis(N.N-dimethylamido)phosphoryl-5-isobutyl-3-aminotriazole-1.2.4. |
| LIV | N-bis(N.N-dimethylamido)phosphoryl-5-n-propyl-3-aminotriazole-1.2.4. |
| LV | N-bis(N.N-dimethylamido)phosphoryl-5-n-butyl-3-aminotriazole-1.2.4. |
| LVI | N-bis(N.N-dimethylamido)phosphoryl-6-methylbenztriazole. |
| LVII | N-bis(N.N-dimethylamido)phosphoryl-3-ureido-5-phenyltriazole-1.2.4. |
| LVIII | N-bis(N.N-dimethylamido)phosphoryl-3-acetylamine-5-phenyl-triazole-1.2.4. |
| LIX | N-bis(N.N-dimethylamido)phospheryl-3.5-dimethyl-4-aminopyrazole. |
| LX | N-bis(N.N-dimethylamido)phosphoryl-5-n-pentyl-3-aminotriazole-1.2.4. |
| LXI | N-bis(N.N-dimethylamido)phosphoryl-5-benzyl-3-aminotriazole-1.2.4. |
| LXII | N-bis(N.N-dimethylamido)phospheryl-5-phenyl-3-aminotriazole-1.2.4. |
| LXIII | N-bis(monomethylamido)phosphoryl-3-amino-5-benzyltriazole-1.2.4. |
| LXIV | N-bis(monomethylamido)phosphoryl-3-amino-5-phenyltriazole-1.2.4. |
| LXV | N-bis(N.N-dimethylamido)phosphoryl-3-amino-5-phenyltriazole-1.2.4. |
| LXVI | N-bis(N.N-dimethylamido)phosphoryl-3-perchloromethylmercaptoaminotriazole-1.2.4. |

Other compounds according to the invention are for example:

N-bis(N.N-dimethylamido)phosphoryl-2.3-dimethylindole;

N-bis(N.N-dimethylamido)phosphoryl-3-nitrocarbazole;

N-bis(N.N-dimethylamido)phosphoryl-pyrazole;

N-bis(N.N-dimethylamido)phosphoryl-3.4.5-trimethylpyrazole;

N-bis(N.N-dimethylamido)phosphoryl-3-methyl-5-phenylpyrazole;

N-bis(N.N-dimethylamido)phosphoryl-3-methyl-4-phenylpyrazole;

N-bis(N.N-dimethylamido)phosphoryl-4-chloropyrazole;

N-bis(N.N-dimethylamido)phosphoryl-4-nitropyrazole;

N-bis(N.N-dimethylamido)phosphoryl-3-methylindazole;

N-bis(N.N-dimethylamido)phosphoryl-3-chloro-5-nitroindazole;

N-bis(N.N-dimethylamido)phosphoryl-3-methyl-5-chloroindazole;

N-bis(N.N-dimethylamido)phosphoryl-3-aminoindazole;

N-bis(N.N-dimethylamido)phosphoryl-3-phenylindazole;

N-bis(N.N-dimethylamido)phosphoryl-imidazole;

N-bis(N.N-dimethylamido)phosphoryl-2-methylimidazole;

N-bis(N.N-dimethylamido)phosphoryl-2-phenylimidazole;

N-bis(N.N-dimethylamido)phosphoryl-2-methyl-4-phenylimidazole;

N-bis(N.N-dimethylamido)phosphoryl-2-bromoimidazole;

N-bis(N.N-dimethylamido)phosphoryl-4-methyl-2-p-chlorophenylimidazole;

N-bis(N.N-dimethylamido)phosphoryl-5-methyl-2-phenylbenzimidazole;

N-bis(N.N-dimethylamido)phosphoryl-2-(o-chlorophenyl)-5-methylbenzimidazole;

N-bis(N.N-dimethylamido)phosphoryl-5-chlorobenzimidazole;

N-bis(N.N-dimethylamido)phosphoryl-2-(p-nitrophenyl)benzimidazole;

N-bis(N.N-dimethylamido)phosphoryl-triazole-1.2.3;

N-bis(N.N-dimethylamido)phosphoryl-4.5-dimethyltriazole-1.2.3;

N-bis(N.N-dimethylamido)phosphoryl-4-phenyltriazole-1.2.3;

N-bis(N.N-dimethylamido)phosphoryl-5-anilino-4-phenyl triazole-1.2.3;

N-bis(N.N-dimethylamido)phosphoryl-4-carbethoxy triazole-1.2.3;

N-bis(N.N-dimethylamido)phosphoryl-3-methyltriazole-1.2.4;

N-bis(N.N-dimethylamido)phosphoryl-3-n-pentyltriazole-1.2.4;

N-bis(N.N-dimethylamido)phosphoryl-3-phenyltriazole-1.2.4;
N-bis(N.N - dimethylamido)phosphoryl-3.5 - diethyl triazole-1.2.4;
N-bis(N.N-dimethylamido)phosphoryl-3.5-diaminotriazole-1.2.4;
N-bis(N.N-dimethylamido)phosphoryl-3-bromo-5-phenyltriazole-1.2.4;
N-bis(N.N - dimethylamido)phosphoryl - 3 - amino-5-α-naphthyltriazole-1.2.4;
N-bis(N.N - dimethylamido)phosphoryl-3-amino - 5 - β-naphthyltriazole-1.2.4;
N-bis(N.N - dimethylamido)phosphoryl - 3 - amino-5-α-thienyltriazole-1.2.4;
N-bis(N.N-dimethylamido)phosphoryl-3-amino-5-α-furyltriazole-1.2.4;
N-bis(N.N-dimethylamido)phosphoryl-3-amino-p-nitrophenyltriazole-1.2.4;
N-bis(N.N-dimethylamido)thiophosphoryl-3-amino-5-carbethoxy triazole-1.2.4;
N-bis(N.N-dimethylamido)thiophosphoryl-3-amino-5-carb(iso)propoxytriazole-1.2.4;
N-bis(N.N-dimethylamido)thiophosphoryl-3-amino-5-carb-n-pentoxy triazole-1.2.4.

The reactions described under (a) to (i) for the production of compounds according to the invention are to be considered as particular modes of a more general method which are characterized in that the cyclic-nitrogen-containing heterocyclic compound, preferably in the presence of a hydrogen halide acid binder or the cyclic-nitrogen-containing heterocyclic compound, in which the hydrogen atom of the group >NH is replaced in the nucleus by a metal atom, preferably sodium or potassium, is caused to react with a compound of the general formula:

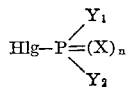

wherein Hlg is a halogen atom, preferably a chlorine atom, X is oxygen or sulphur and $n=0$ or 1 and $Y_1$ and $Y_2$ are both halogen, preferably chlorine, or $Y_1$ is a group

wherein $R_1$ and $R_2$ are each hydrogen or an aliphatic hydrocarbon radical, preferably a methyl group and $Y_2$ is a halogen, preferably chlorine or a group

wherein $R_3$ and $R_4$ are each hydrogen or an aliphatic hydrocarbon radical, preferably a methyl group and the product obtained, when $n=1$ and $Y_1$ and $Y_2$ are halogen atoms, is converted with ammonia, a mono- or dialkylamine or the product obtained, when $n=1$, $Y_1$ is the group

is halogen, is converted with ammonia, a mono- or dialkylamine, or the product obtained, when $n=0$ and $Y_1$ and $Y_2$ are halogen atoms, is converted with ammonia, a mono- or dialkylamine, followed by oxidation, when X designates oxygen and by the reaction of sulphur, when X is sulphur, or the product obtained, when $n=0$, $Y_1$ is the group

and $Y_2$ is halogen, is converted with ammonia, a mono- or dialkylamine, followed by oxidation when X designates oxygen and by the reaction of sulphur, when X is sulphur, or the product obtained, when $n=0$ and $Y_1$ and $Y_2$ are both nitrogen-containing groups, is oxidized, when X is oxygen or is converted by the reaction of sulphur into the final product, when X designates sulphur.

By laboratory experiments it has been found that compounds according to the invention have an activity against various kinds of noxious organisms, particularly fungi and, moreover, against insects and mites, especially red-spider mites.

It has furthermore been found that a certain number of the compounds are capable of affecting the growth of plants.

It was found, in particular, that many compounds have an activity against fungus species of the family of Erysiphaseae.

Plants of which the aerial parts were treated with a compound according to the invention were considerably less sensitive to infection by fungi than untreated plants (contact effect). A protective action against the infection by fungi could be stated, when a compound according to the invention was administered to the roots of the plant (emphytic (systemic) action).

The experiments in which the contact-fungicidal action was ascertained, were carried out as follows.

Young barley plants (*Hordeum vulgare*) were cultivated at a temperature between 15 and 18° C. in small flowerpots until they had a length of about 7 cm. Then they were sprayed with dilutions of the compound to be tested in acetone. A dilution series had solutions of concentrations of 1000, 100 and 10 mg. of active compound per litre. Seven plants in one pot were sprayed simultaneously with 0.2 ml. of the solution. The experiment was repeated twice, each time with 7 new plants; in total 21 plants were sprayed with the same liquid. Immediately after spraying the plants were dusted with vital conidia of *Erysiphe graminis* (mildew). This was carried out by arranging the pots of a test series together under a spacious globe, wherein the conidia of the mildew were distributed by means of a flow of air brushing along strongly infected barley leaves. Then the assembly was left to itself for some time so that the conidia settled uniformly down on the plants. The plants were then put into a space in which the temperature was 18 to 20° C. and a relative humidity of about 90° prevailed, whilst continuously fluorescent lamps (white light) of about 3000 lux intensity illuminated the plants. Five days after the inoculation distinct stains of the mildew fungus, which gave off abundant spores, had been formed on the check plants not treated with the active compound.

The extent of infection on each plant was evaluated by a numeral of the series 0 to 10, of which 0 means no infection and 10 means that the whole leaf is covered stains.

For one test series (21 evaluations) the numbers obtained were summarized.

Since the various substances were tested at different dates, which could affect the results, the extent of infection of each plant was always compared with that produced by 2.4 - dinitro - 6(1'-methylheptyl)-1-phenylcrotonate. For this reason those doses were determined which resulted in a 50% protection of the plant both with the compound to be tested and with the phenylcrotonate derivative. The quotients of these doses are indicated in Table V under "Contact" of the column: "Action against mildew." According as this quotient is higher, the fungicidal action of the compound tested is greater.

The emphytic (systemic) fungicidal action was determined as follows. Barley was sown in glass pots of about 60 cm.³ of contents, containing washed sand, wetted by a liquid nutrient. When the plants came out, 10 cm.³ of a solution or suspension of the compound to be tested was introduced into the sand of each pot, so that each pot received 1 and 10 mg. of this compound respectively. Afterwards the 6 cm. plants were infected as described above with vital conidia of *Erysiphe graminis* (mildew).

The extent of infection was expressed in a percentage on the basis of that of infected plants not treated with a compound according to the invention, the inflection of the latter being fixed at 100%. The percentages thus obtained were converted in evaluation numbers, as indicated in Table VI. The emphytic (systemic) fungicidal action of a number of compounds according to the invention, expressed in these numerals, is indicated in Table V under "Emphytic" of the column "Action against mildew."

*Table VI*

| Mgs. of compound per pot | Infection in percent | | | | |
|---|---|---|---|---|---|
| 10 | 0 | 0 | 0 | <50 | 50–100 |
| 1 | 0 | <50 | 50–100 | 100 | 100 |
| Evaluation numerals | 5 | 4 | 3 | 2 | 1 |

In Table V is also mentioned the number of the example, in which the production of the tested compound is described. Under the heading of "Phytotoxicity" is indicated in Table V the extent of leaf burning produced by spraying with a 1% aqueous solution or dispersion of the tested substance of tomato, oats, broad beans, chickweed or beet; "—" means no damage, "±" little damage, "+" fairly strong damage and "++" strong damage. Table V indicates furthermore the toxicity for warm-blooded. The numerals indicated in column $LD_{50}$ mouse mg./kg. are the doses in mg. per kg. of mice (test animal) causing 50% of kill of the animals when administered orally.

The compounds according to the invention mostly have activity against insects, for example, *Musca domestica* L, *Sitophilus granadius* L, *Leptinotarsa decemlineata* Say, *Aphis fabae* Scop and *Acyrthosiphon onobryghis* Kalt. The active compounds are frequently contact poison and stomach poison for the insects. It was, moreover, stated that leaf-eating and juice-sucking insects on the aerial parts of the plants are usually killed, if the compounds according to the invention are administered to the root system.

It has furthermore been found that compounds obtained in accordance with the invention have often also an activity against mites (Acari), particularly red spider mites (Tetranychidae).

The experiments in which the insecticide and acaricide action was assessed were carried out as follows.

Broad bean plants (*Vicia faba* L) were dipped in a dispersion or solution of the tested compound in water. The compounds were used in the following concentrations: 1000, 300, 100, 30 and 10 mgs. per litre (p.p.m.). After the dispersion or the solution on the plants had dried, the plants were infected with adult apterous females of the black bean aphis (*Aphis fabae* Scop) or of *Acyrthosiphon onobrychis* Kalt. Similar experiments were carried out on French bean plants (*Phaseolus vulgaris* L), which were infected with adult females of bean red spider (*Tetranychus urticae* Koch). At the same time check experiments were made. The kill of the insects and red spider mites on the untreated plants is calculated in the kill percentages in accordance with Abbott's formula. This formula is:

$$\frac{a-b}{a} \times 100 = \text{kill percentage}$$

wherein $a$ designates the number of survivors in the check plant and $b$ the number of survivors on the object concerned.

In a second series of experiments an emphytic (systemic) insecticide action of the compounds according to the invention was assessed. With these experiments the same kinds of plants and test animals were used. However, in this case the plants were cultivated in glass pots, filled with washed sand. The plants were fed with a liquid nutrient.

To the pots a solution or dispersion of the tested compound in water was added. The employed doses were 62.5, 12.5, 2.5, 0.5 and 0.1 mg. of the compound per pot. By screening the plants were protected from the vapour of the compound concerned. Then the plants were infected with aphis and red spider mites respectively.

With the two series of experiments it was assessed how many insects or mites had been killed three days after the infection. The kill on check plants was subtracted. A kill percentage of 90 to 100% was evaluated by "+," a kill percentage between 50 and 90% by "±" and a smaller kill percentage by "—." The results of these experiments are indicated in Table V. The column "aphis" indicates the insecticidal action, the column "tetranychus" the acaricidal action. D designates the results of the "dip experiments," E those of the "emphytic (systemic)" experiments. The numerals 1 to 5 under "Aphis" and "Tetranychus" indicate in a decreasing order of succession the concentrations of the tested compounds used in the aforesaid experiments.

*Table V*

| Compound of Example No. | Action against mildew | | Aphis | | | | | Tetranychus | | | | | Phyto-toxicity | $LD_{50}$ mouse, mg./kg. |
|---|---|---|---|---|---|---|---|---|---|---|---|---|---|---|
| | emphytic | contact | 1 | 2 | 3 | 4 | 5 | 1 | 2 | 3 | 4 | 5 | | |
| I | 3 | 1–3 | D + / E + | + / + | + / + | ± / ± | — / ± | + / + | + / + | + / + | ± / + | — / ± | — | 5–10 |
| II | 2 | 1–3 | D + / E + | + / + | + / + | + / + | + / + | + / + | + / + | + / + | ± / + | ± / + | — | 5–10 |
| III | 2 | 3–10 | D + / E + | + / + | + / + | + / + | ± / + | + / + | + / + | + / + | + / + | ± / ± | ± | 5–10 |
| IV | 2 | ca. 3 | D + / E + | + / + | + / + | + / + | — / + | + / + | + / + | + / + | + / + | — / ± | — | 5–10 |
| V | 4 | 10 | D + / E + | + / + | + / + | ± / + | — / ± | + / + | + / + | + / + | + / + | + / ± | ± | 5–10 |
| VI | 3 | 1–3 | D + / E + | — / — | — / — | — / — | — / — | + / + | + / — | + / — | | | ± | 10–20 |
| VII | 2 | 0.03–0.1 | D — / E — | — / — | — / — | — / — | — / — | ± / — | — / — | — / — | — / — | — / — | + | 20–40 |
| VIII | 3–4 | 1–3 | D + / E + | + / + | + / + | + / + | ± / + | + / + | + / + | + / + | + / + | + / — | — | 10–20 |
| IX | 3–4 | 0.03–0.1 | D ± / E + | — / ± | — / — | — / — | — / — | + / + | + / + | + / + | + / + | + / + | | 5–10 |

| Compound of Example No. | Action against mildew | | Aphis | | | | | | Tetranychus | | | | | Phyto-toxicity | LD₅₀ mouse, mg./kg. |
|---|---|---|---|---|---|---|---|---|---|---|---|---|---|---|---|
| | emphytic | contact | | 1 | 2 | 3 | 4 | 5 | 1 | 2 | 3 | 4 | 5 | | |
| X | 3-1 | 0.01 | D<br>E | +<br>± | +<br>+ | +<br>+ | -<br>+ | -<br>+ | +<br>+ | ±<br>+ | +<br>± | +<br>- | +<br>- | - | 10-20 |
| XI | | 0.01-0.03 | D<br>E | -<br>+ | -<br>+ | -<br>- | -<br>- | -<br>- | ±<br>- | -<br>- | -<br>- | -<br>- | -<br>- | - | 200-400 |
| XII | 2 | 0.1 | D<br>E | -<br>+ | -<br>- | -<br>- | -<br>- | -<br>- | +<br>- | -<br>- | -<br>- | -<br>- | -<br>- | ± | >1000 |
| XIII | | <0.01 | D<br>E | +<br>+ | +<br>+ | ±<br>+ | -<br>+ | -<br>± | +<br>+ | +<br>+ | -<br>+ | -<br>+ | -<br>± | ± | 150-200 |
| XIV | 1 | 0.1 | D<br>E | +<br>+ | -<br>+ | -<br>± | -<br>- | -<br>- | +<br>+ | +<br>+ | ±<br>± | -<br>- | -<br>- | + | 50-100 |
| XV | 2 | 0.3 | D<br>E | +<br>+ | +<br>+ | +<br>+ | ±<br>± | -<br>- | +<br>+ | +<br>+ | +<br>± | +<br>- | ±<br>- | ± | 10-20 |
| XVI | 2 | 0.1 | D<br>E | +<br>± | ±<br>- | -<br>- | -<br>- | -<br>- | -<br>- | -<br>- | -<br>- | -<br>- | -<br>- | - | 5-10 |
| XVII | | <0.01 | D<br>E | +<br>+ | -<br>+ | -<br>+ | -<br>± | -<br>- | -<br>+ | -<br>+ | -<br>+ | -<br>- | -<br>- | - | 600-900 |
| XVIII | 1 | 0.03-0.1 | D<br>E | ±<br>+ | -<br>+ | -<br>+ | -<br>± | -<br>- | -<br>+ | -<br>+ | -<br>- | -<br>- | -<br>- | - | 400-800 |
| XIX | 2 | 0.01 | D<br>E | +<br>+ | +<br>+ | ±<br>+ | -<br>- | -<br>- | ±<br>+ | -<br>+ | -<br>+ | -<br>± | -<br>- | - | 400-800 |
| XXXVI | 1 | 1-3 | D<br>E | +<br>+ | -<br>- | -<br>- | -<br>- | -<br>- | +<br>+ | -<br>- | -<br>- | -<br>- | -<br>- | + | 52-194 |
| XXXVII | 5 | 1 | D<br>E | +<br>+ | +<br>+ | ±<br>+ | -<br>- | -<br>- | +<br>+ | +<br>+ | +<br>+ | -<br>+ | -<br>+ | ± | 100-200 |
| XXXVIII | 4 | 0.1 | D<br>E | +<br>+ | +<br>+ | +<br>+ | ±<br>+ | -<br>- | +<br>+ | +<br>+ | +<br>+ | ±<br>- | -<br>- | - | 5-10 |
| XXXIX | 4 | 0.1-0.3 | D<br>E | +<br>+ | +<br>+ | +<br>+ | ±<br>+ | -<br>- | +<br>+ | +<br>+ | +<br>± | ±<br>- | -<br>- | + | 84-1200 |
| XL | 5 | 3-10 | D<br>E | +<br>+ | +<br>+ | +<br>+ | +<br>+ | ±<br>- | +<br>+ | +<br>+ | +<br>+ | ±<br>- | -<br>- | ++ | 140-714 |
| XLI | 5 | 1-3 | D<br>E | +<br>+ | +<br>+ | +<br>+ | -<br>+ | -<br>± | +<br>+ | +<br>+ | +<br>+ | +<br>+ | +<br>- | + | 100-316 |
| XLII | 2 | 0.3 | D<br>E | +<br>+ | -<br>± | -<br>± | -<br>- | -<br>- | -<br>- | -<br>- | -<br>- | -<br>- | -<br>- | + | 24-75 |
| XLIII | 1 | 0.1-0.3 | D<br>E | +<br>+ | ±<br>+ | -<br>± | -<br>- | -<br>- | +<br>+ | +<br>- | -<br>- | -<br>- | -<br>- | + | 75-237 |
| XLIV | 5 | 1 | D<br>E | +<br>+ | +<br>± | +<br>- | -<br>- | -<br>- | +<br>+ | +<br>+ | +<br>± | ±<br>- | -<br>- | ++ | 24-75 |
| XLV | | <0.01 | D<br>E | -<br>- | -<br>- | -<br>- | -<br>- | -<br>- | -<br>- | -<br>- | -<br>- | -<br>- | -<br>- | ++ | 246-4060 |
| XLVI | 3 | 0.1 | D<br>E | +<br>- | +<br>- | +<br>- | +<br>- | -<br>- | +<br>- | +<br>- | ±<br>- | -<br>- | -<br>- | ++ | 316-1000 |
| XLVII | | 0.03-0.1 | D<br>E | -<br>- | -<br>- | -<br>- | -<br>- | -<br>- | -<br>- | -<br>- | -<br>- | -<br>- | | ± | 316-1000 |
| XLVIII | 4 | 3-10 | D<br>E | +<br>+ | +<br>- | +<br>- | -<br>- | -<br>- | +<br>+ | +<br>+ | +<br>- | -<br>- | -<br>- | + | 1.3-4.2 |
| XLIX | | 3-10 | D<br>E | +<br>+ | ±<br>± | -<br>± | -<br>- | -<br>- | +<br>+ | +<br>+ | +<br>± | ±<br>- | -<br>- | ++ | 10-32 |
| L | | 1 | D<br>E | +<br>+ | ±<br>± | -<br>+ | -<br>± | -<br>± | +<br>+ | +<br>+ | +<br>± | ±<br>- | -<br>- | ± | 1.4-7.1 |
| LI | 2 | 0.1 | D<br>E | -<br>- | -<br>- | -<br>- | -<br>- | -<br>- | -<br>- | -<br>- | -<br>- | -<br>- | | ± | >1000 |
| LXVI | | 1 | D<br>E | +<br>+ | +<br>+ | +<br>+ | -<br>+ | -<br>- | | | | | | | 10-20 |

Interesting biocidal activity have, in particular, the compounds according to the invention in which the phosphoryl group is a bis (dimethylamido) phosphoryl group, particularly those in which each cyclic carbon atom of the cyclic-nitrogen containing heterocyclic nucleus with 5 cyclic atoms has a substituent and/or forms part of a cyclic system condensed with a benzene nucleus.

From the experimental results it can furthermore be concluded that owing to their satisfactory fungicidal activity particularly n-bis (dimethylamido) phosphoryl-3-amino-5-alkyl- and 5-aryl-triazole-1.2.4 and particularly those in which the alkyl-group has 1 to 7 carbon atoms and those in which the aryl-group is a phenyl-group are interesting; owing to their satisfactory insecticidal and acaricidal activities in particular those in which the aryl-group is a phenyl-group and those in which the alkyl-group has 1 to 5 carbon atoms and especially those in which this group is a pentyl-group are important; also the N-bis (dimethylamido) phosphoryl-3-aminotriazole-1.2.4 has, at the side of satisfactory fungicidal activity, satisfactory insecticidal and acaricidal activities; in this respect also N-bis(dimethylamido) phosphoryl-triazole-1.2.4 and -3-chlorotriazole-1.2.4 are important, also since these compounds have little toxicity for warm blooded; conspicuously satisfactory acaricidal activity has also N-bis (dimethylamido)-phosphoryl-5-benzyl-3-aminotriazole-1.2.4.

Of the triazole-1.2.3-derivatives according to the invention particularly the N-bis (dimethylamido)-phosphoryl-benztriazole is important owing to its satisfactory fungicidal, insecticidal and acaricidal activities and low toxicity for warm-blooded.

Of the imidazole derivatives according to the invention particularly satisfactory fungicidal, insecticidal and acaricidal activities have N-bis (dimethylamido)-phosphoryl-2-alkyl- and particularly -2-methyl- and -2-phenylbenzimidazole and N-bis (dimethylamido) phosphoryl-5-nitrobenzimidazole.

By their phytotoxic activity are especially distinguished N-bis (dimethylamido) phosphoryl-3-chloro-5-pentyltriazole-1.2.4; N-bis (dimethylamido) thiophosphoryl-3-chloro-triazole-1.2.4 and -3-chloro-5-pentyltriazole-1.2.4; N-bis (dimethylamido) phosphoryl-3-chloro-indazole and -2-pentyl-benzimidazole.

A compound according to the invention can be processed in a conventional manner to obtain a composition for combating noxious organisms.

To this end they are mixed or dissolved with or in solid or liquid carriers and, if desired, enriched with dispersion agents, emulsifiers and/or wetting agents. Thus, for example, miscible oils, spray powders and dusts may be obtained.

For the production of miscible oils the active compound is dissolved in a suitable solvent which is sparingly soluble in water and to this solution is added an emulsifier. Suitable solvents are, for example, xylene, toluene, dioxane, petroleum distillates rich in aromatic compounds such as solventnaphtha, distilled tar oil, furthermore tetraline, cyclohexane or mixtures of these liquids. Suitable emulsifiers are inter alia: alkylphenoxyglycolethers, polyoxyethylene-sorbitane esters of fatty acids or polyoxyethylene-sorbitolesters of fatty acids. A number of these emulsifiers are known under the trade names of "Triton," "Tween" and "Atlex."

The concentration of the active compound in the sparingly water-soluble liquid is not subjected to narrow limits. It may fluctuate between 2 and 50% by weight. Before use the miscible oils are emulsified in water and the emulsion obtained is sprayed. As a rule, the concentration of the active compound in these aqueous emulsions lies between 0.01 and 0.5% by weight.

Wettable powders can be produced by mixing the active compound with a solid, inert carrier and by grinding them, usually in the presence of a dispersion and/or wetting agent. Before use the wettable powders are dispersed in a liquid, preferably water and this dispersion is volatilized.

Suitable carrier material is, for example, pipe clay, diatomaceous earth, kaolin, dolomite, talcum, gypsum, clay, bentonite, attapulgite, kieselguhr, celithe, wood meal, tobacco dust or ground coconut shells. Suitable dispersion agents are lignine sulphonates and naphthalene sulphonates. Wetting agents such as fatty alcohol sulphates, alkylarylsulphonates or fatty acid condensation products, for example, those known under the trade name of "Igepon" are suitable.

Also with the wettable powders the concentration of the active compounds is not subjected to narrow limits. As a rule, the concentration will be chosen between 10 and 80% by weight.

Dusts can be produced by applying the active compound as such or dissolved in a solvent to a solid carrier material. During its use the composition obtained is dusted in the air in a dry, finely powdered state. These powders may also be produced, when choosing suitable, light carrier material, in the manner described for spraying powders. Suitable carrier materials are the substances mentioned above for the production of wettable powders. The concentration of active compounds in the dusts is usually lower than that of the wettable powders or miscible oils, but higher than the concentration of active compound in dispersions or emulsions obtained by diluting wettable powders or miscible oils with liquids. The dusts often contain 1 to 20% of active substance.

What is claimed is:

1. A method of combatting plant harmful organisms comprising treating a living plant with a benzimidazole phosphorus compound of the formula:

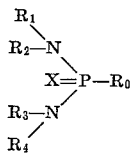

wherein $R_1$, $R_2$, $R_3$ and $R_4$ are each independently selected from the group consisting of hydrogen and alkyl of 1 to 5 carbons, X is a bivalent atom selected from the group consisting of sulfur and oxygen, $R_0$ is selected from the group consisting of benzimidazole and substitution products of said benzimidazole wherein from 1 to 3 of the nuclear carbons of the imidazole ring are substituted with a member selected from the group consisting of alkyl of 1–18 carbons, alkenyl of 1–18 carbons, alkylamino of 1–18 carbons, dialkylamino wherein each alkyl moiety contains 1–18 carbons, alkoxy of 1–18 carbons, alkylmercapto of 1–18 carbons, bromo, chloro, nitro, phenyl, amino, carbo-lower alkoxy, chloro-phenyl, nitrophenyl and ureido, and wherein the phosphorus is joined directly to a ring nitrogen of the imidazole moiety.

2. A method of combatting plant harmful organisms comprising treating a living plant with an imidazole phosphorus compound of the formula

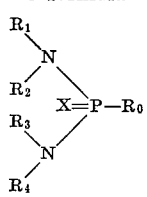

wherein $R_1$, $R_2$, $R_3$ and $R_4$ are each independently selected from the group consisting of hydrogen and alkyl of 1 to 5 carbons, X is a bivalent atom selected from the group consisting of sulfur and oxygen, $R_0$ is selected from the group consisting of imidazole and substitution products of said imidazoles wherein from 1 to 3 of the nuclear carbons of the imidazole ring are substituted with a member selected from the group consisting of alkyl of 1–18 carbons, alkenyl of 1–18 carbons, alkylamino of 1–18 carbons, dialkylamino wherein each alkyl moiety contains 1–18 carbons, alkoxy of 1–18 carbons, alkylmercapto of 1–18 carbons, bromo, chloro, nitro, phenyl, amino, carbo-lower alkoxy, chlorophenyl, nitrophenyl and ureido, and wherein the phosphorus is joined directly to a ring nitrogen of the imizadole moiety.

3. A method of combatting plant harmful organisms comprising treating a living plant with the compound of claim 1 wherein $R_1$, $R_2$, $R_3$ and $R_4$ are each alkyl of 1 to 5 carbon atoms, $R_0$ is 2-alkyl benzimidazole and X is oxygen.

4. A method of combatting plant harmful organisms comprising treating a living plant with N-bis(N,N-dimethylamido)-phosphoryl-2-methyl-benzimidazole wherein the phosphorus is directly attached to a ring nitrogen of the imidazole moiety.

5. A method of combatting plant harmful organisms comprising treating a living plant with N-bis(N,N-dimethylamido-phosphoryl-2-phenylbenzimidazole wherein the phosphorus is directly attached to a ring nitrogen of the imidazole moiety.

6. A method of combatting plant harmful organisms comprising treating a living plant with N-bis(N,N-dimethylamido)phosphoryl - 5 - nitrobenzimidazole wherein the phosphorus is directly attached to a ring nitrogen of the imidazole moiety.

7. A method of combatting plant harmful organisms comprising treating a living plant with N-bis(N,N-dimethylamido)phosphoryl - 2 - ethylbenzimidazole wherein the phosphorus is directly attached to a ring nitrogen of the imidazole moiety.

8. A method of combatting plant harmful organisms comprising treating a living plant with N-bis(N,N-dimethylamido)phosphoryl-2-pentylbenzimidazole wherein the phosphorus is directly attached to a ring nitrogen to the imidazole moiety.

References Cited by the Examiner

UNITED STATES PATENTS

| | | |
|---|---|---|
| 2,706,194 | 4/1955 | Morris et al. |
| 2,751,384 | 6/1956 | Coover et al. 260—248 |
| 2,888,379 | 5/1959 | Bruning et al. 167—33 |
| 3,121,090 | 2/1964 | Koopmans et al. 167—33 |

FOREIGN PATENTS

| | | |
|---|---|---|
| 1,227,473 | 3/1960 | France. |
| 713,278 | 8/1954 | Great Britain. |
| 808,638 | 2/1959 | Great Britain. |

OTHER REFERENCES

Frear et al.: J. of Economic Entomology, vol. 40, pp. 736–741 (1947).

Frear: Chem. of Insecticides, published by Van Nostrand, 3rd edition, pp. 76–79, 87–90, and 301 (1955).

Malatesta et al.: Chem. Abst., vol. 50, col. 1827 (1956).

Smolin et al.: Heterocyclic Compounds, page 19 (1959).

Vabachnik et al.: Chem. Abst., vol. 51, col. 4982 (1957).

LEWIS GOTTS, *Primary Examiner.*

FRANK CACCIAPAGLIA, JR., *Examiner.*